（12） United States Patent
Nagatani et al.

(10) Patent No.: US 7,736,796 B2
(45) Date of Patent: Jun. 15, 2010

(54) BATTERY PACK

(75) Inventors: Masatomo Nagatani, Hiroshima (JP); Yasushi Hirakawa, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 11/607,093

(22) Filed: Dec. 1, 2006

(65) Prior Publication Data

US 2007/0141458 A1    Jun. 21, 2007

(30) Foreign Application Priority Data

Dec. 1, 2005    (JP)  ............................. 2005-347816

(51) Int. Cl.
*H01M 2/24*    (2006.01)
(52) U.S. Cl. .................................... 429/158
(58) Field of Classification Search ................ 439/627, 439/510, 500; 429/158, 151, 157, 178, 156, 429/162
See application file for complete search history.

(56) References Cited

U.S. PATENT DOCUMENTS 4,581,306 A    4/1986    Hasenauer et al.

7,270,576 B2 *   9/2007   Kim et al. ................... 439/627
2002/0022159 A1*  2/2002   Pierson et al. ................. 429/1
2005/0058892 A1*  3/2005   Ovshinsky et al. .......... 429/120

FOREIGN PATENT DOCUMENTS

JP    11-167912    6/1999

* cited by examiner

*Primary Examiner*—Patrick Ryan
*Assistant Examiner*—Moniqe Wills
(74) *Attorney, Agent, or Firm*—McDermott Will & Emery LLP

(57) ABSTRACT

A battery pack is made up of a plurality of flat prismatic batteries arranged face to face, each battery having one electrode terminal protruding from one end face in the height direction of the battery case and this end face or a side face of the battery serving as the other electrode terminal. The connector for electrically connecting adjacent prismatic batteries includes a flat part that is welded to one electrode terminal of one prismatic battery of the adjacent prismatic batteries, and a cylindrical part that is fitted onto and welded to the other electrode terminal of the other prismatic battery. The cylindrical part is formed in an attachment part that extends from the flat part through an upright part in the direction in which the batteries are aligned. The connector enables reliable electrical connection of the prismatic batteries despite possible variation in height of the electrode terminals.

4 Claims, 4 Drawing Sheets

BATTERY PACK

The present disclosure relates to subject matter contained in priority Japanese Patent Application No. 2005-347816 filed on Dec. 1, 2005, the contents of which is herein expressly incorporated by reference in its entirety.

BACKGROUND OF THE INVENTION

1. Field of the Invention

The present invention relates to a battery pack made up of two or more prismatic batteries electrically connected together.

2. Description of the Related Art

Battery assembly, more commonly known as a "battery module" or "battery pack", is made up of two or more batteries that are connected in series to output a predetermined voltage, and used for the power source of cordless devices such as mobile phones and electric tools, or of hybrid vehicles. With the downsizing of electric devices, volume-efficient prismatic batteries are increasingly used. One problem with the battery pack of prismatic batteries is that because the batteries are arranged in face-to-face relationship, the terminals of adjacent batteries that are to be connected are located more closely to each other as compared to a battery pack of cylindrical batteries, and also the connectors for connecting these terminals are smaller than those used for cylindrical batteries, because of which precise positioning of terminals and connectors relative to each other is hard to achieve.

When connecting two prismatic batteries, the connector is held by a jig or human fingers, and its position is adjusted relative to the cap-like terminal of the prismatic battery. It is difficult, however, to ensure that the small connector is always precisely positioned in a reliable manner, and because of this difficulty in positioning of the components, the work efficiency of spot welding is extremely poor. Also, there is always the risk of weld failure caused by a misaligned connector and of other troubles such as short-circuiting caused by a dropped connector.

In light of these problems, the applicant of the present invention has proposed a design that facilitates series connection of prismatic batteries of a battery pack, with which connectors are precisely positioned in a reliable manner on the cap-like terminals of the batteries before the welding, and the risk of weld failure caused by misalignment of the connector during the spot-welding is reduced (Japanese Patent Laid-Open Publication No. Hei 11-167912).

FIG. 5 and FIG. 6 show this type of battery pack: Prismatic batteries Ba1 shown in FIG. 6 are connected together using a connector 30 shown in FIG. 5. The connector 30 consists of a flat end 30a to be welded to the electrode terminal plate 32 of one prismatic battery Ba1, and a square U-shaped slit with a pair of engaging ends 30b and 30c formed by bending. The engaging ends are fitted onto the cap-like terminal 31 of the other prismatic battery Ba1 such as to cover the terminal from both sides.

When connecting two batteries Ba1 with this connector 30, the pair of engaging ends 30b and 30c are placed over the cap-like terminal 31 so that the connector 30 is set in position in both widthwise and lengthwise directions relative to the battery Ba1. The position of the connector 30 is thus defined reliably and the risk of weld failure resulting from misalignment of the connector during the spot welding is reduced. Moreover, when fitted onto the cap-like terminal 31, the connector 30 need not be held with fingers or the like, which largely reduces the time required for the positioning during welding.

On the other hand, when arranging the batteries face to face so that the positive electrode and the negative electrode of two adjacent batteries Ba1 are in alternate positions, they must be positioned relative to each other with an offset x in the height direction that corresponds to the height of the cap-like electrode terminal 31. Thus, if there is a variation in the height of the cap-like electrode terminal 31 and flat electrode terminal 32 of the batteries Ba1, the contact between the connector 30 and the terminals 31 and 32 may not be tight enough, leading to a weld failure in which the connector 30 separates from the terminal 31 or 32 by vibration or the like.

Another problem is that the above-described connector 30 cannot be used for electrically connecting prismatic batteries Ba2 of the type shown in FIG. 1, which each have a negative terminal 3 protruding from the sealing plate 2 that closes one open end of the battery case 1.

SUMMARY OF THE INVENTION

In light of the problems encountered by the conventional techniques, it is an object of the present invention to provide a battery pack of a plurality of prismatic batteries having one electrode terminal protruding from the sealing plate with a design that reduces the risk of weld failure and ensures reliable connection of the batteries despite possible variation in height of the electrode terminals.

To achieve the above object, the present invention provides a battery pack including a plurality of flat prismatic batteries arranged face to face, each battery having one electrode terminal protruding from one end face in a height direction of the flat prismatic battery case and this end face or a side face of the battery serving as the other electrode terminal. A connector for connecting the adjacent prismatic batteries includes a flat part that is welded to one electrode terminal of one prismatic battery of the adjacent prismatic batteries, and a cylindrical part that is fitted onto and welded to the other electrode terminal of the other prismatic battery. The cylindrical part is formed in an attachment part that extends from the flat part through an upright part in a direction in which the prismatic batteries are aligned.

In a preferred embodiment, the connector integrally includes the flat part, the upright part extending at right angles from one end of the flat part, a linkage part extending at right angles from the upright part to one side, a connection part extending at right angles from one end of the linkage part in the opposite direction from the flat part, the attachment part extending at right angles from one side at one end of the connection part parallel to the flat part and in the opposite direction from the linkage part, and the cylindrical part formed in the attachment part.

Preferably, the cylindrical part of the connector has a height that is 1.5 times larger than its material thickness, whereby it is ensured that the electrical resistance across two connected prismatic batteries is low and stable.

Preferably, the inside diameter at one open end of the cylindrical part of the connector is larger than the outside diameter of the one electrode terminal of the prismatic battery, and the inside diameter at the other open end of the cylindrical part is smaller than the outside diameter of the one electrode terminal.

In this battery pack, the cylindrical part of the connector can slide on the one electrode terminal, i.e., its attachment position on the electrode terminal is adjustable, so that any variation in height of adjacent two batteries is accommodated and the flat part is always made to contact the other electrode terminal. Consequently, even in the case where there is a relative misalignment between the prismatic batteries in their height during assembly, the flat part and one electrode terminal, and the cylindrical part and the other electrode terminal, are respectively welded together in tight contact with each other, whereby the risk of weld failure is eliminated and a highly reliable weld that can withstand vibration or the like is achieved, which all contribute to high-yield production of the battery packs.

Moreover, since the connector is bridged across two adjacent batteries with its cylindrical part being coupled to one electrode terminal and the flat part abutting on the other electrode terminal, the connector is restricted in position both in the up and down direction and in the left and right direction with respect to the adjacent batteries and prevented from offsetting. Thus, the welding is performed easily without the need of using any jig or human fingers for holding the connector, whereby productivity is enhanced.

Also, because of the shape of the connector in which the cylindrical part and the flat part are spaced apart from each other in the lengthwise direction of the prismatic batteries that are arranged face to face, all the prismatic batteries that are arranged face to face can be oriented in the same direction, unlike some conventional battery packs in which the prismatic batteries are arranged face to face alternately in opposite directions so that the positive electrode terminal and the negative electrode terminal are positioned alternately. This allows the batteries to be easily and precisely positioned with each other and contributes to further enhancement of productivity.

Furthermore, the productivity can be improved by the fact that the one electrode terminal is easily guided into the cylindrical part because of the inside diameter at one open end of the cylindrical part being slightly larger than the outside diameter of the electrode terminal. Moreover, weld failure is prevented reliably by the fact that the electrode terminal makes tight contact with the cylindrical part as the former is pressed towards the other open end of the latter, because of the inside diameter at the other open end of the cylindrical part being slightly smaller than the outside diameter of the electrode terminal.

The above and other objects and features of the present invention will become apparent from the following description of preferred embodiments given in conjunction with the accompanying drawings.

DETAILED DESCRIPTION OF THE PREFERRED EMBODIMENTS

Figure 1:
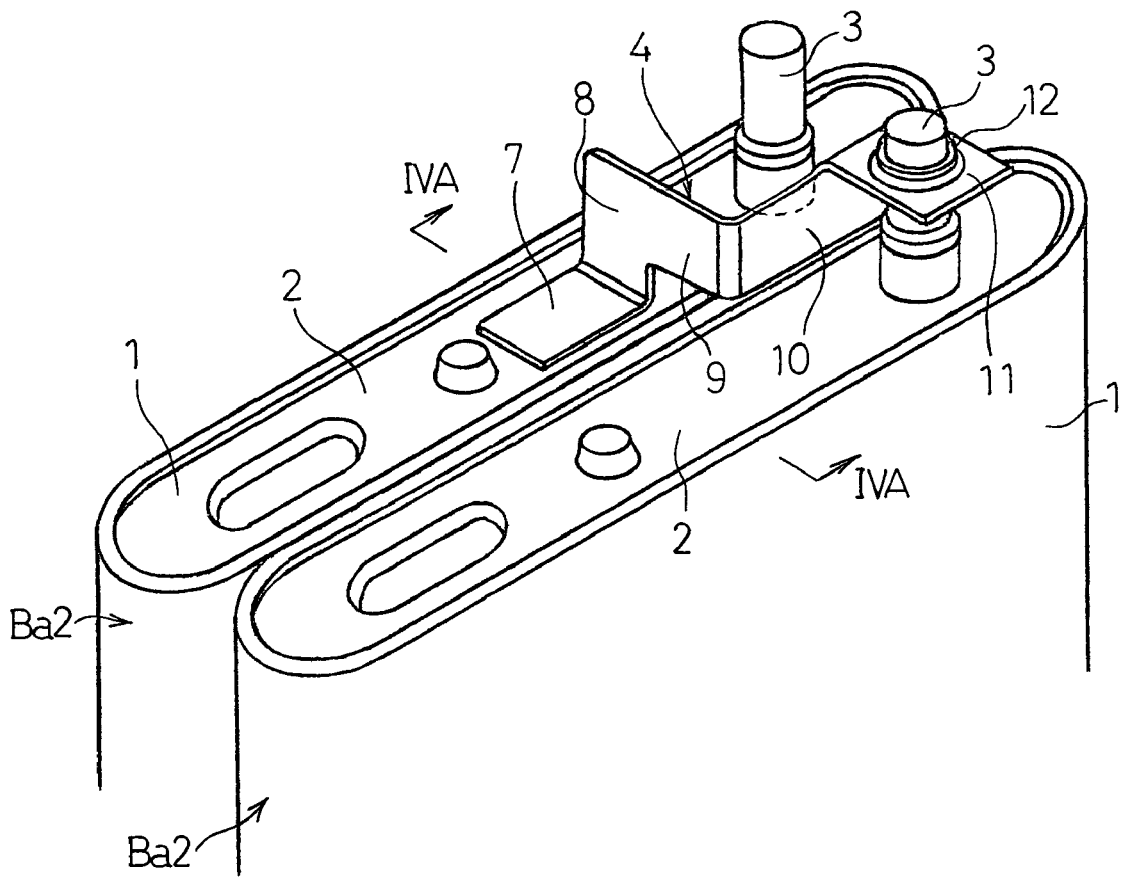
FIG. 1 a perspective view illustrating relevant parts of the battery pack according to one embodiment of the present invention.

Preferred embodiments of the present invention will be hereinafter described with reference to the drawings. FIG. 1 is a perspective view illustrating relevant parts of the battery pack according to one embodiment of the present invention. Flat prismatic batteries Ba2 with a negative terminal 3 protruding from the sealing plate 2 are arranged face to face and electrically connected to each other with a connector 4.

First, the connector 4 is described with reference to the perspective view of FIG. 2. The connector 4 includes: a flat part 7 welded on the sealing plate 2 of one of the two adjacent prismatic batteries Ba2, the sealing plate 2 serving as the positive electrode of the battery together with the battery case 1; an upright part 8 that is formed by bending one end of the flat part 7 at right angles; a linkage part 9 extending from substantially the upper half of the upright part 8 to one side; a connection part 10 that is formed by bending one end of the linkage part 9 at right angles in the opposite direction from the flat part 7; an attachment part 11 that is formed by bending the upper side of one end of the connection part 10 at right angles in the opposite direction from the linkage part 9; and a cylindrical part 12 formed on the upper face of the attachment part 11. The connector 4 is made from aluminum in one piece so as to have low electrical resistance.

Figure 2:
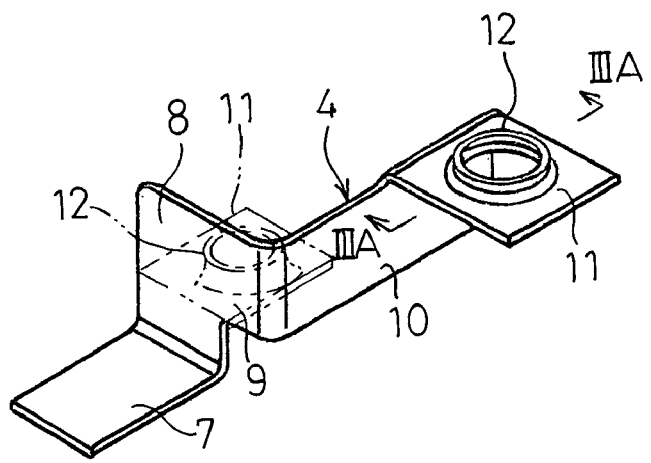
FIG. 2 is a perspective view of a connector used in the battery pack.
Figure 3A:
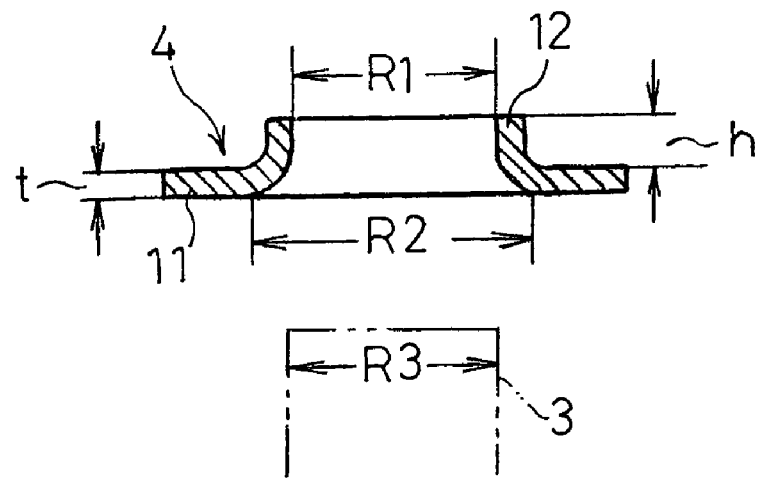
FIG. 3A is an enlarged cross section taken along the line IIIA-IIIA of FIG. 2.

FIG. 3A is an enlarged cross section taken along the line IIIA-IIIA of FIG. 2. As shown, the hole in the cylindrical part 12 has a larger inside diameter R2 at the lower open end than the inside diameter R1 at the upper open end with an increasing taper from top to bottom. These inside diameters R1 and R2 are set relative to the outside diameter R3 of the negative terminal 3 of the battery Ba2 so that R1<R3<R2, but there is only a slight difference between them.

The battery pack is produced as follows: A plurality of prismatic batteries Ba2 are arranged face to face in the thickness direction, with their negative terminals 3 all being oriented in the same direction. The cylindrical part 12 of the connector 4 is fitted onto the negative terminal 3 of one of the two adjacent batteries Ba2, and the flat part 7 of the connector 4 is abutted on the sealing plate 2 of the other battery Ba2. Since the inside diameter R2 at the lower open end of the cylindrical part 12 is slightly larger than the outside diameter R3 of the negative terminal 3, the negative terminal 3 is smoothly guided into the inside of the cylindrical part 12, and because the inside diameter R1 at the upper open end of the cylindrical part 12 is slightly smaller than the outside diameter R3, the negative terminal 3 makes tight contact with the cylindrical part 12 as the negative terminal 3 is pressed towards the upper open end of the cylindrical part 12. In this state, the flat part 7 is laser-welded to the sealing plate 2 and the cylindrical part 12 is laser-welded to the negative terminal 3, so that the two adjacent batteries Ba2 are electrically connected in series.

Figure 4A:
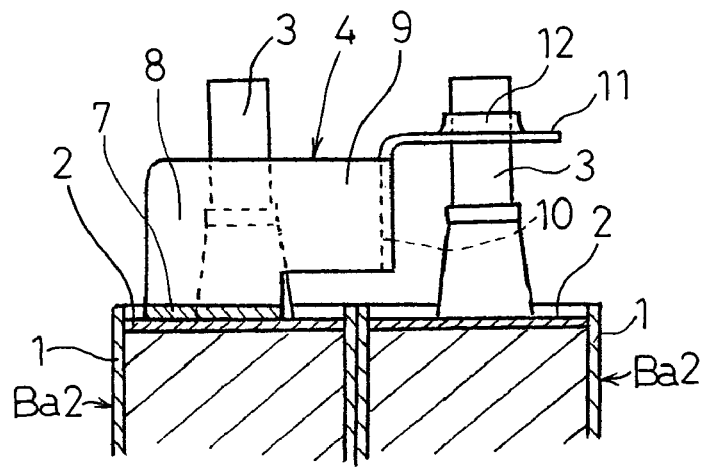
FIG. 4A is an enlarged cross section taken along the line IVA-IVA of FIG. 1, and FIG. 4B and FIG. 4C are enlarged cross sections of examples shown for comparison in which two prismatic batteries have different heights or are offset from each other.
Figure 4B:
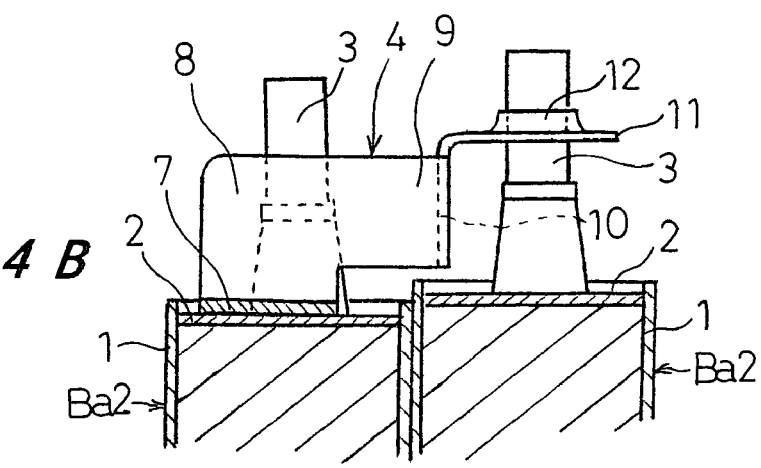
Figure 4C:
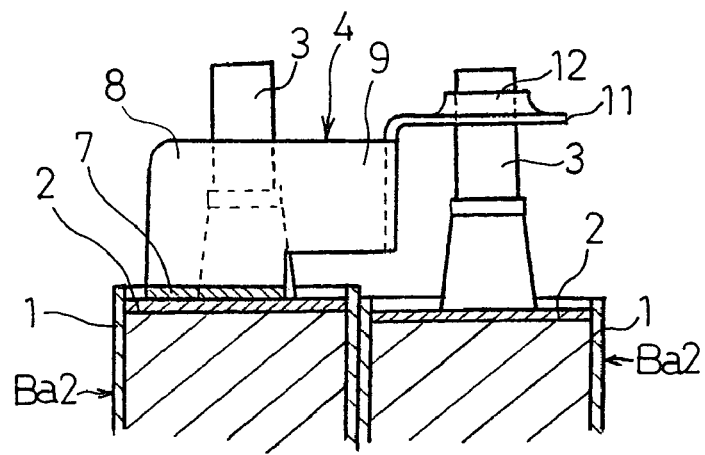
Figure 5:
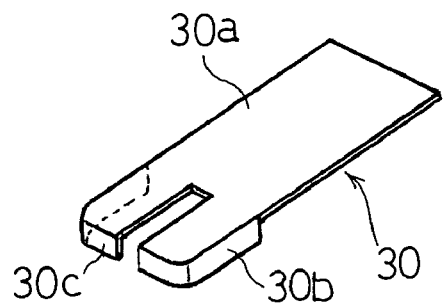
FIG. 5 is a perspective view of a connector used in a conventional battery pack.
Figure 6:
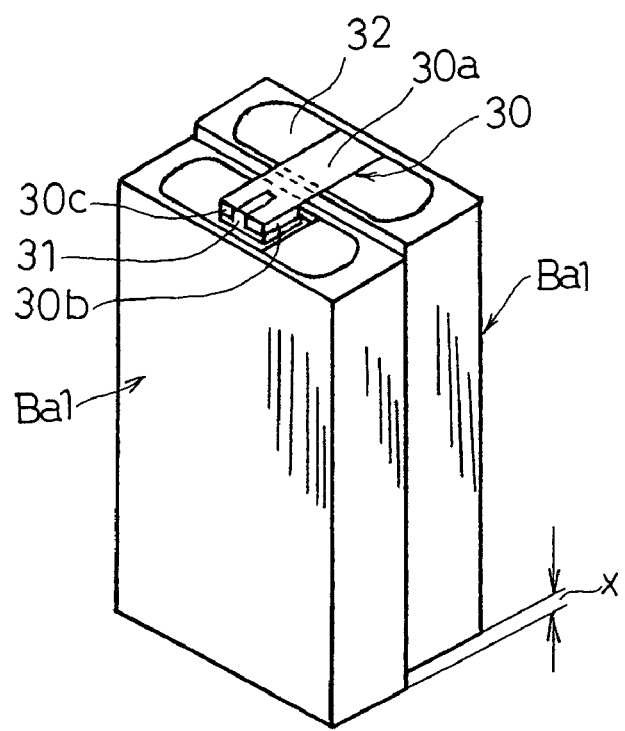
FIG. 6 is a perspective view of a conventional battery pack assembled using the connector of FIG. 5.

FIG. 4A is an enlarged cross section taken along the line IVA-IVA of FIG. 1, and FIG. 4B and FIG. 4C are enlarged cross sections of examples shown for comparison in which two prismatic batteries have different heights or are offset from each other. For ease of understanding, the height variation is somewhat exaggerated in FIG. 4B and FIG. 4C. As can be seen by comparing FIG. 4A with FIG. 4B and FIG. 4C, the cylindrical part 12 can slide on the negative terminal 3, i.e., its attachment position on the negative terminal 3 is adjustable, so that any variation in the height of adjacent two prismatic batteries Ba2 is accommodated and the flat part 7 is always made to contact the sealing plate 2. Consequently, even in the case where there is a relative misalignment between the prismatic batteries Ba2 in their height during assembly, the flat part 7 and the sealing plate 2, and the cylindrical part 12 and the negative terminal 3, are respectively laser-welded together in tight contact with each other, whereby the risk of weld failure is eliminated and a highly reliable weld that can withstand vibration or the like is achieved, which all contribute to high-yield production of the battery packs.

Since the connector 4 is bridged across two adjacent batteries Ba2 with its cylindrical part 12 being coupled to the negative terminal 3 of one battery Ba2 and the flat part 7 abutting on the sealing plate 2 of the other battery Ba2, the connector 4 is restricted in position both in the up and down direction and in the left and right direction with respect to the adjacent batteries Ba2 and prevented from offsetting. Thus, the laser welding is performed easily without the need of using any jig or human fingers for holding the connector, whereby productivity is enhanced.

Also, the productivity is improved by the fact that the negative terminal 3 is easily guided into the cylindrical part 12 because of the inside diameter R2 at the lower open end of the cylindrical part 12 being slightly larger than the outside diameter R3 of the negative terminal 3. Moreover, weld failure is prevented reliably by the fact that the negative terminal 3 makes tight contact with the cylindrical part 12 as the former is pressed towards the upper open end of the latter, because of the inside diameter R1 at the upper open end of the cylindrical part 12 being slightly smaller than the outside diameter R3 of the negative terminal 3.

The characteristic shape of the connector 4, in which the cylindrical part 12 and the flat part 7 are spaced apart from each other via the connection part 10 in the lengthwise direction of the batteries Ba2 that are arranged face to face, can also contribute to further enhancement of productivity for the following reasons: In some conventional battery packs, the prismatic batteries are arranged face to face alternately in opposite directions so that the positive electrode terminal and the negative electrode terminal are positioned alternately. Unlike such battery packs, according to the invention, all the prismatic batteries Ba2 that are arranged face to face are oriented in the same direction. This allows the plurality of prismatic batteries Ba2 to be easily and precisely positioned with each other by, for example, arranging the bottom of the batteries (opposite end from the protruding negative terminal 3) to abut on a flat surface.

Next, the relationship between the material thickness t of the connector 4 and the height h of the cylindrical part 12 shown in FIG. 3A will be described, which was clarified by actually producing battery packs in accordance with the above procedure and testing them. Using a 0.5 mm thick plate material, five types of connectors 4 were produced, with their cylindrical part 12 being 0.1 mm, 0.3 mm, 0.5 mm, 0.75 mm, and 1.0 mm high, respectively. Battery packs were made using these connectors 4 to electrically connect the prismatic batteries Ba2, and resistance across the negative electrode 3 and one end of the flat part 7 of the connector 4 was measured. The results were as follows: The battery packs with the 0.75 mm and 1.0 mm high laser-welded cylindrical parts 12 exhibited stable resistance, while there were variations in the resistance in other battery packs. The unstable resistance after the welding is attributable to the small height h of the cylindrical part 12 because of which it deformed, causing a weld failure or a rupture in the weld due to the stress of deformation of the connector 4. The results showed that the cylindrical part 12 of the connector 4 should have a height h that is 1.5 times larger than the thickness t of the connector 4 to make the resistance stable.

Figure 3B:
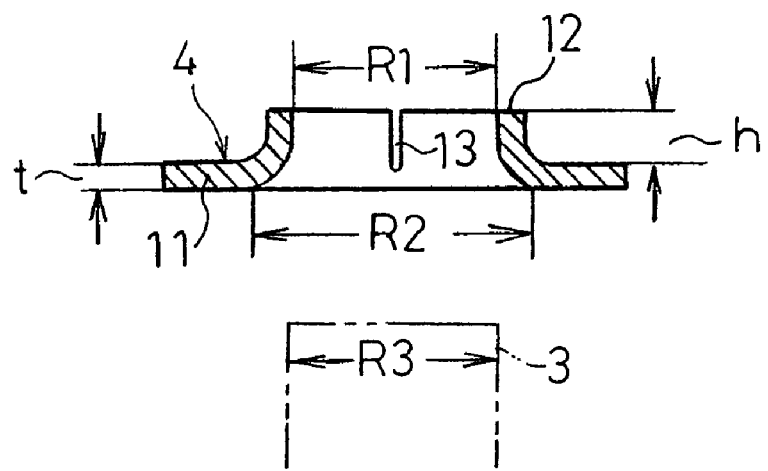
FIG. 3B is an enlarged cross section of the same part of FIG. 3A of a variation of the connector.

In another preferred embodiment, as shown in FIG. 3B, the cylindrical part 12 of the connector 4 may have a slit 13 formed more or less into the mid point of the height h from the upper open end. This allows resilient deformation of the cylindrical part 12 at the upper open end that has the smaller inside diameter R1 when coupling the cylindrical part 12 onto the negative terminal 3, facilitating, and ensuring pressure-fit and tight contact between them.

In a yet another embodiment, as shown by the two-dot chain line in FIG. 2, the connector 4 may be formed to have the cylindrical part 12 in the attachment part 11 that extends parallel to and oppositely from the flat part 7 from the upright part 8 at the position where the linkage part 9 extends. This connector 4 is suitably used for electrical connection of cylindrical batteries.

As described above, the battery pack of the invention consists of a plurality of flat prismatic batteries arranged face to face, each battery having one electrode terminal protruding from one end face in the height direction of the battery case and this end face or a side face of the battery serving as the other electrode terminal. The connector for connecting adjacent prismatic batteries includes a flat part that is welded to one electrode terminal of one prismatic battery of the adjacent prismatic batteries, and a cylindrical part that is fitted onto and welded to the other electrode terminal of the other prismatic battery. The cylindrical part is formed in an attachment part that extends from the flat part through an upright part in the direction in which the prismatic batteries are aligned. As the attachment position of the cylindrical part on the one electrode terminal is adjustable, any variation in height of adjacent two prismatic batteries is accommodated and the flat part is always made to contact the other electrode terminal. Therefore, a highly reliable weld is achieved so that it can withstand vibration or the like, which contributes to high-yield production of the battery packs. Also, since the connector is bridged across two adjacent prismatic batteries in a manner in which it is restricted in position both in the up and down direction and in the left and right direction with respect to the two prismatic batteries and prevented from offsetting, the laser welding is performed easily without the need of using any jig or human fingers for holding the connector, whereby productivity is enhanced.

While the preferred embodiments of the invention have been described using specific terms, such description is for illustrative purposes only, and it is to be understood that various changes and modifications may be made without departing from the spirit or scope of the following claims.

What is claimed is:

1. A battery pack comprising:
a plurality of flat prismatic batteries arranged face to face, each battery having one electrode terminal protruding from one end face in a height direction of a flat prismatic battery case and the end face or a side face of the battery serving as the other electrode terminal; and
a connector for connecting the adjacent prismatic batteries, the connector including a flat part that is welded to one electrode terminal of one prismatic battery of the adjacent prismatic batteries, and a cylindrical part that is fitted onto and welded to the other electrode terminal of the other prismatic battery, the cylindrical part being formed in an attachment part that extends from the flat part through an upright part in a direction in which the prismatic batteries are aligned,
wherein the upright part extends at right angles from one end of the flat part, and extends in a substantially parallel direction to the height direction of the flat prismatic battery case.

2. The battery pack according to claim 1, wherein the connector integrally includes: the flat part; the upright part; a linkage part extending at right angles from the upright part to one side; a connection part extending at right angles from one end of the linkage part in the opposite direction from the flat part; the attachment part extending at right angles from one side at one end of the connection part parallel to the flat part and in the opposite direction from the linkage part; and the cylindrical part formed in the attachment part.

3. The battery pack according to claim 1, wherein the cylindrical part of the connector has a height that is 1.5 times larger than its material thickness.

4. The battery pack according to claim 1, wherein an inside diameter at one open end of the cylindrical part of the connector is larger than an outside diameter of the one electrode terminal of the prismatic battery, and an inside diameter at the other open end of the cylindrical part is smaller than the outside diameter of the one electrode terminal.

* * * * *